United States Patent
Hsu (10) Patent No.: US 8,538,494 B2
(45) Date of Patent: Sep. 17, 2013

(54) MOBILE PHONE AND METHOD FOR TRANSFERRING BATTERY POWER OF THE MOBILE PHONE

(75) Inventor: Cheng-Jung Hsu, New Taipei (TW)

(73) Assignee: Chi Mei Communication Systems, Inc., New Taipei (TW)

( * ) Notice: Subject to any disclaimer, the term of this patent is extended or adjusted under 35 U.S.C. 154(b) by 54 days.

(21) Appl. No.: 13/339,205

(22) Filed: Dec. 28, 2011

(65) Prior Publication Data
US 2012/0231857 A1 Sep. 13, 2012

(30) Foreign Application Priority Data
Mar. 10, 2011 (TW) .................... 100108020

(51) Int. Cl.
*H04B 1/38* (2006.01)
(52) U.S. Cl.
USPC ....... 455/573; 361/679.33; 320/107; 713/300
(58) Field of Classification Search
USPC .................. 455/573; 361/679.33; 320/107; 713/300
See application file for complete search history.

(56) References Cited

U.S. PATENT DOCUMENTS

| | | | |
|---|---|---|---|
| 7,333,328 B2 * | 2/2008 | Funawatari et al. | 361/679.33 |
| 7,679,317 B2 * | 3/2010 | Veselic | 320/107 |
| 7,768,150 B2 * | 8/2010 | Platania et al. | 307/19 |
| 2011/0127950 A1 * | 6/2011 | Veselic | 320/107 |
| 2012/0266001 A1 * | 10/2012 | Sha et al. | 713/300 |

FOREIGN PATENT DOCUMENTS
JP  2007095417 A  *  4/2007

* cited by examiner

*Primary Examiner* — Charles Shedrick
(74) *Attorney, Agent, or Firm* — Altis Law Group, Inc.

(57) ABSTRACT

In a method for transferring battery power of a mobile phone, the mobile phone includes a discharge circuit, a charge circuit, a switch circuit and a universal serial bus (USB) interface. The switch circuit includes an exclusive-OR (XOR) chip and a switch chip. The USB interface connects to the discharge circuit when an input terminal and an enabling terminal of the switch chip are set at high level. The discharge circuit controls a battery of the mobile phone to be discharged for charging a mobile device via a USB cable and the USB interface. The USB interface connects to the charge circuit when the input terminal and the enabling terminal of the switch chip are set at low level. The charge circuit controls the battery to be charged using the mobile device via the USB cable and the USB interface.

20 Claims, 6 Drawing Sheets

MOBILE PHONE AND METHOD FOR TRANSFERRING BATTERY POWER OF THE MOBILE PHONE

BACKGROUND

1. Technical Field

Embodiments of the present disclosure relate generally to mobile phone charging, and more particularly, to a mobile phone and method for transferring battery power of the mobile phone.

2. Description of Related Art

Battery capacity of a mobile phone is limited, causing users to often miss some important phone calls when the battery of the mobile phone runs low of power. Usually, users can charge the battery of the mobile phone using a charger that electronically connects to a fixed power source. However, the method is inconvenient if the users cannot find the fixed power source nearby for charging the battery.

DETAILED DESCRIPTION

The disclosure, including the accompanying drawings, is illustrated by way of example and not by way of limitation. It should be noted that references to "an" or "one" embodiment in this disclosure are not necessarily to the same embodiment, and such references mean at least one.

Figure 1:
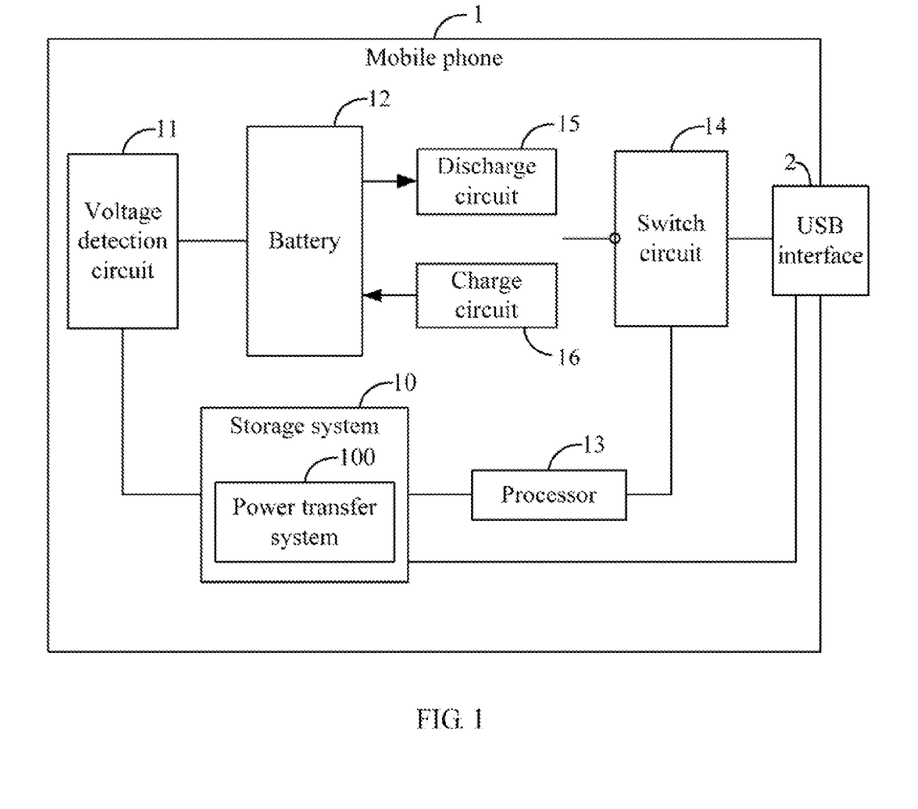
FIG. 1 is a block diagram of one embodiment of a mobile phone including a power transfer system.
Figure 2:
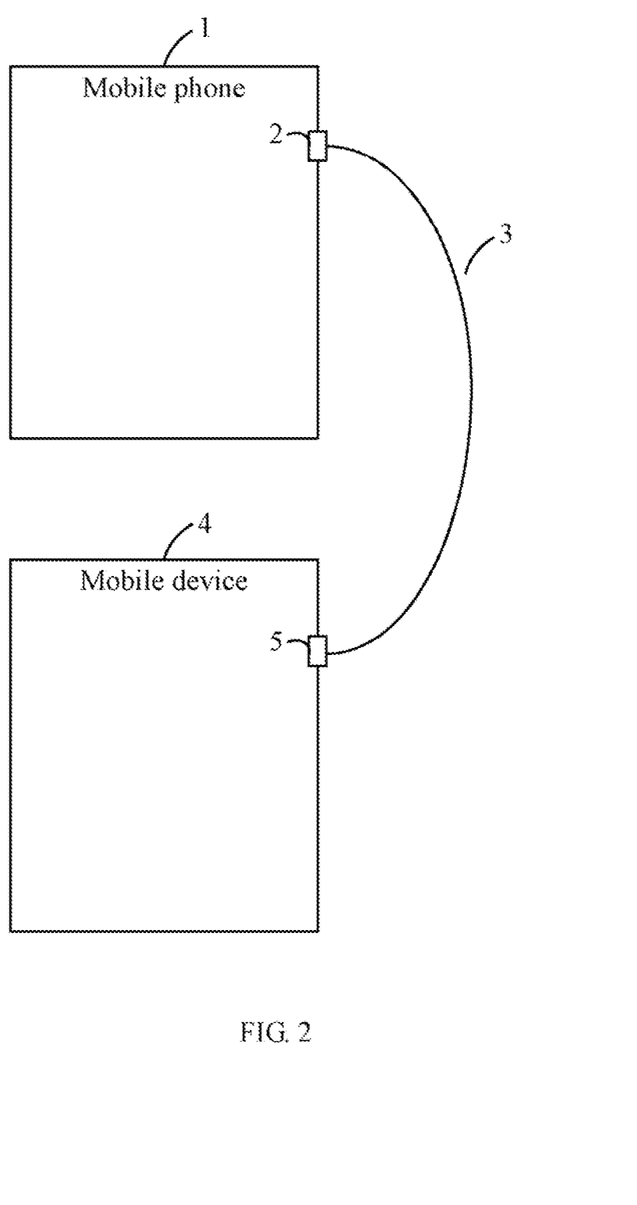
FIG. 2 is a schematic diagram of one embodiment of a mobile device connected to the mobile phone of FIG. 1.

FIG. 1 is a block diagram of one embodiment of a mobile phone 1 including a power transfer system 100. In the embodiment, the mobile phone 1 further includes universal serial bus (USB) interface 2, a storage system 10, a voltage detection circuit 11, a battery 12, at least one processor 13, a switch circuit 14, a discharge circuit 15, and a charge circuit 16. The mobile phone 1 electronically connects to a mobile device 4 (referring to FIG. 2) that includes the same USB interface 5 as the USB interface 2 via a USB cable 3. FIG. 1 is just one example of the mobile phone 1, and in other embodiments, the mobile phone 1 may include more or fewer components than shown, and in different configurations.

In the embodiment, the mobile device 4 is regarded as a target mobile phone, and has the same configuration or substantially the same configuration as the mobile phone 1. The power transfer system 100 is configured to transfer battery power between the mobile phone 1 and the mobile device 4. That is to say, the power transfer system 100 charges the mobile phone 1 by transferring the battery power of the mobile device 4 to the mobile phone 1, or charges the mobile device 4 by transferring the battery power of the mobile phone 1 to the mobile device 4.

The power transfer system 100 may be in the form of one or more programs stored in the storage system 10 and executed by the at least one processor 13. In one embodiment, the storage system 10 may be random access memory (RAM) for temporary storage of information, and/or a read only memory (ROM) for permanent storage of information. In other embodiments, the storage system 10 may also be an external storage device, such as a storage card, or a data storage medium. The at least one processor 13 executes computerized operations of the mobile phone 1 and other applications, to provide functions of the mobile phone 1.

Figure 3:
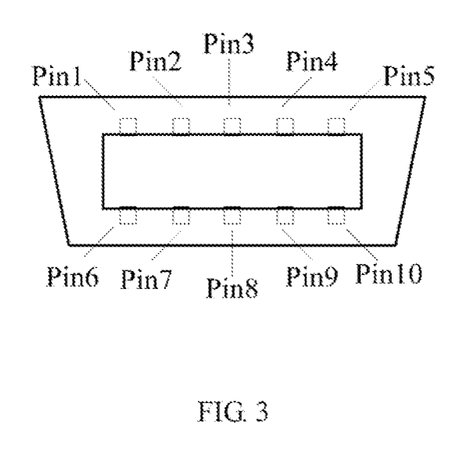
FIG. 3 is a schematic diagram of one embodiment of a USB interface included in the mobile phone of FIG. 1

The USB interface 2 includes a first control pin and a second control pin. Referring to FIG. 3, the pin 7 is regarded as the first control pin, and the pin 8 is regarded as the second control pin. The USB interface 5 of the mobile device 4 also includes a first control pin and a second control pin correspondingly. The first control pin of the USB interface 2 electronically connects to the second control pin of the USB interface 5, and the second control pin of the USB interface 2 electronically connects to the first control pin of the USB interface 5 via the USB cable 3.

The voltage detection circuit 11 electronically connects to the battery 12 for detection voltage of the battery 12. The battery 12 is configured with a protection circuit for protecting the battery 12 from over-charging or over-discharging by limiting the voltage of the battery 12 to be no more than a maximum charge voltage and no less than a cutoff voltage. The maximum charge voltage may be 4.2 volts, and the cutoff voltage may be 3.6 volts for a lithium-ion battery, for example.

The discharge circuit 15 and the charge circuit 16 respectively connect to the battery 12. The switch circuit 14 electronically connects to the USB interface 2 and the at least one processor 13. The switch circuit 14 switches on a channel that electronically connects to the discharge circuit 15 or the charge circuit 16. The discharge circuit 15 can control the battery 12 to be discharged when the discharge circuit 15 connects to the switch circuit 14. The charge circuit 16 can control the battery 12 to be charged when the charge circuit 16 connects to the switch circuit 14.

Figure 4:
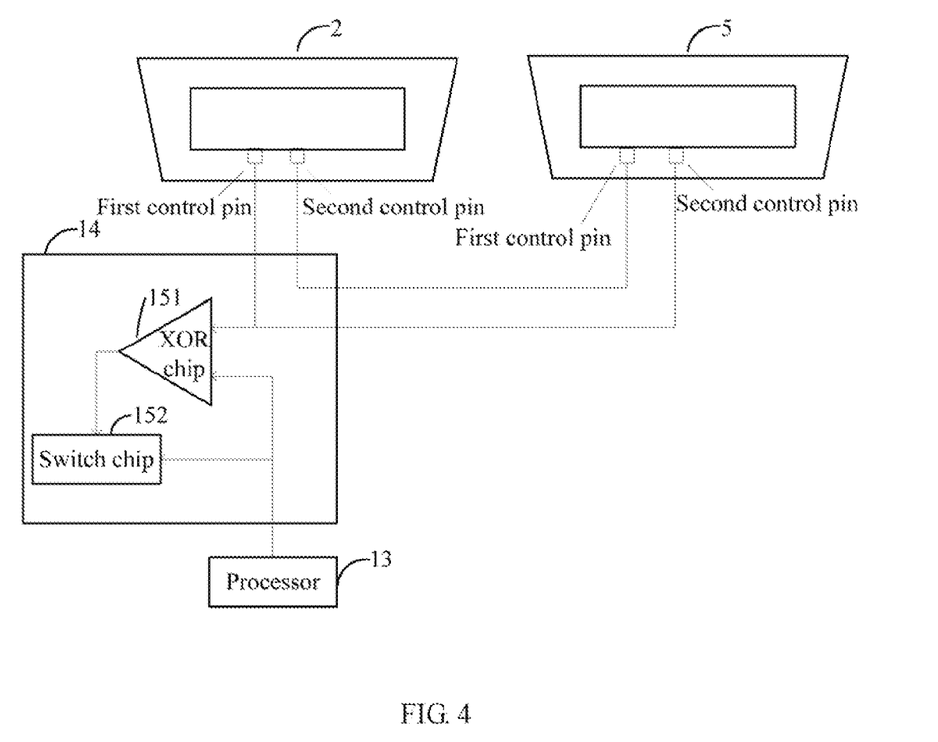
FIG. 4 is a schematic diagram of one embodiment of a circuit of a USB interface and a switch circuit included in the mobile phone of FIG. 1.

FIG. 4 is a schematic diagram of one embodiment of a circuit of a USB interface 2 and a switch circuit 14 included in the mobile phone 1 of FIG. 1. In the embodiment, the switch circuit 14 includes an exclusive-OR (XOR) chip 151 and a switch chip 152. The XOR chip 151 includes two input terminals and an output terminal The switch chip 152 includes an input terminal and an enabling terminal. The first input terminal of the XOR chip 151 electronically connects to the first control pin of the USB interface 2, and the second input terminal of the XOR chip 151 electronically connects to the at least one processor 13. The at least one processor 13 further electronically connects to the input terminal of the switch chip 152. The output terminal of the XOR chip 151 electronically connects to the enabling terminal of the switch chip 152.

The switch chip 152 is enabled when the voltage of the enabling terminal of the switch chip 152 is set at a high level, such as two volts. After the switch chip 152 is enabled, the voltage of the input terminal of the switch chip 152 can determine whether the channel electronically connects to the discharge circuit 15 or the charge circuit 16. The switch chip 152 switches on the channel to connect to the discharge circuit 15 when the voltage of the input terminal of the switch chip 152 is at a high level, or switches the channel to connect to the charge circuit 16 when the voltage of the input terminal of the switch chip 152 is at a low level, such as zero volts. The switch chip 152 is disabled when the voltage of the enabling terminal of the switch chip 152 is set at a low level.

Figure 5:
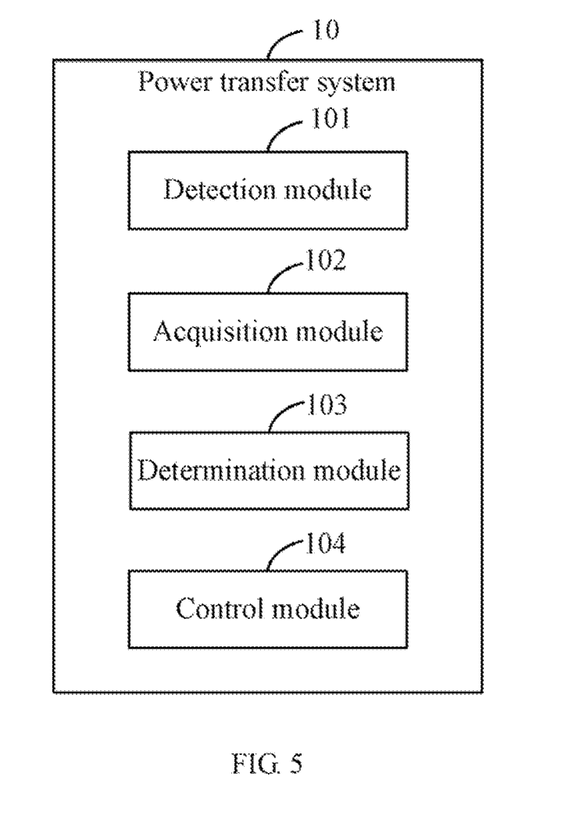
FIG. 5 is a block diagram of one embodiment of functional modules of the power transfer system included in the mobile phone of FIG. 1.

FIG. 4 is a block diagram of one embodiment of functional modules of the power transfer system 100 included in the mobile phone 1 of FIG. 1. In the embodiment, the power transfer system 100 may include a plurality of functional modules each comprising one or more programs or computerized codes that can be accessed and executed by the at least one processor 13. The power transfer system 100 includes a detection module 101, an acquisition module 102, a determination module 103, and a control module 104. A detailed description of each module will be given in the following paragraphs.

In general, the word "module", as used herein, refers to logic embodied in hardware or firmware, or to a collection of software instructions, written in a programming language, such as, Java, C, or assembly. One or more software instructions in the modules may be embedded in firmware, such as in an EPROM. The modules described herein may be implemented as either software and/or hardware modules and may be stored in any type of non-transitory computer-readable medium or other storage device. Some non-limiting examples of non-transitory computer-readable media include CDs, DVDs, BLU-RAY, flash memory, and hard disk drives.

Figure 6:
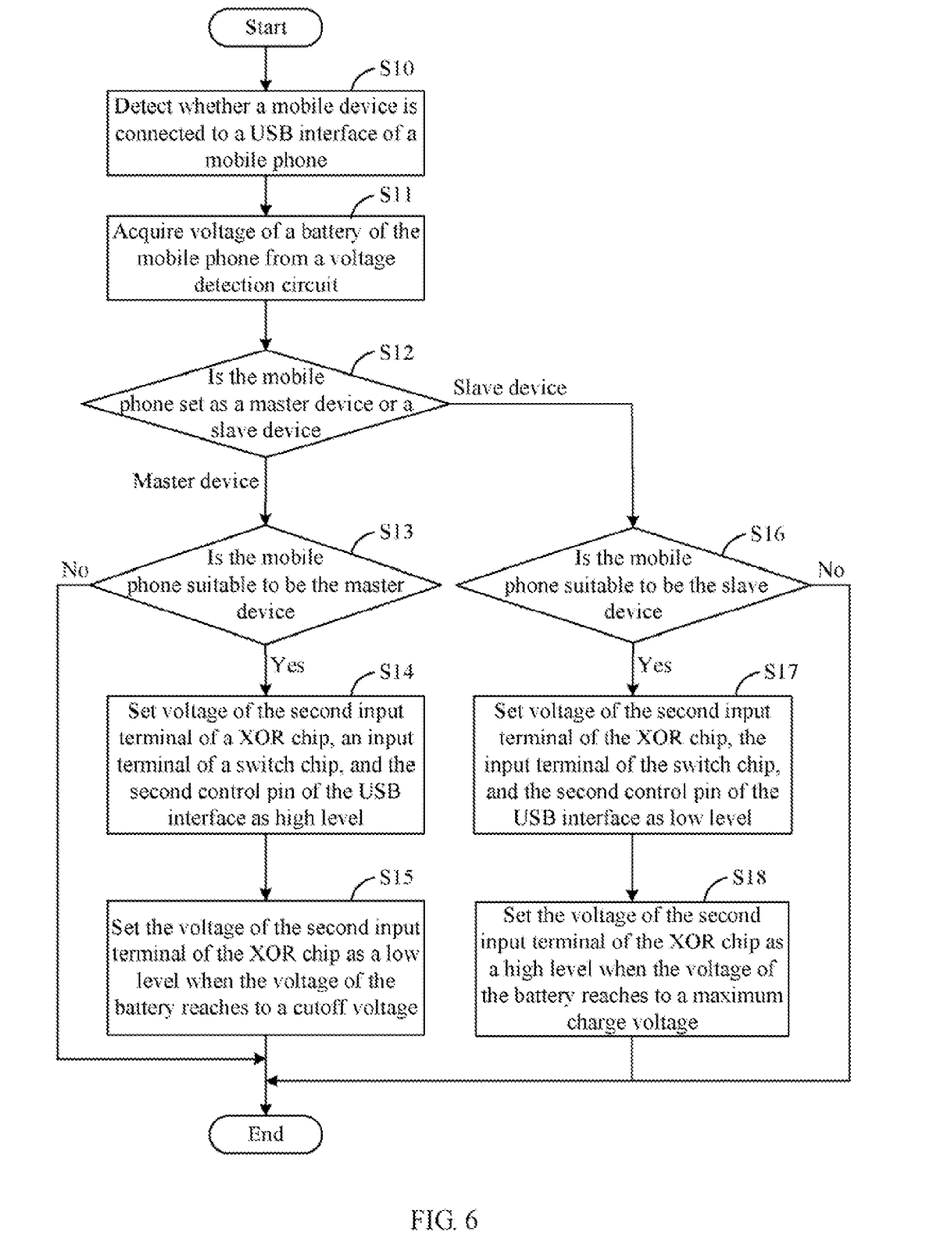
FIG. 6 is a flowchart of one embodiment of a method for transferring battery power of the mobile phone of FIG. 1.

FIG. 5 is a flowchart of one embodiment of a method for transferring battery power of the mobile phone 1 of FIG. 1. Using the method, the mobile phone 1 can be charged by transferring the battery power of the mobile device 4 to the mobile phone 1, and the mobile device 4 can be charged by transferring the battery power of the mobile phone 1 to the mobile device 4.

In block S10, the detection module 101 detects a connection signal generated by the USB interface 2 when the mobile device 4 connects to the USB interface 2 using the USB cable 3.

In block S11, the acquisition module 102 acquires a voltage of the battery 12 detected from the voltage detection circuit 11, and displays the voltage of the battery 12 on a display screen of the mobile phone 1 for observation of the user.

In block S12, the acquisition module 102 acquires a selection of the mobile phone 1 as a master device or a slave device. If the mobile phone 1 is set as the master device, the mobile device 4 can be charged using the mobile phone 1, and block S13 is implemented. If the mobile phone 1 is set as the slave device, the mobile phone 1 can be charged using the mobile device 4, and block S16 is implemented.

In block S13, the determination module 103 determines whether the mobile phone 1 is suitable to be the master device according to the voltage of the battery 12. In the embodiment, the mobile phone 1 is suitable to be the master device if the voltage of the battery 12 is more than the cutoff voltage and no more than the maximum charge voltage. If the mobile phone 1 is suitable to be the master device, block S14 is implemented. If the mobile phone 1 is not suitable to be the master device, the procedure ends.

In block S14, the control module 104 sets the voltage of the second input terminal of the XOR chip 151, the input terminal of the switch chip 152, and the second control pin of the USB interface 2 as high level. The switch circuit 14 connects to the discharge circuit 15 if the mobile device 4 is set as the slave device. The discharge circuit 15 controls the battery 12 to be discharged for charging the mobile device 4 via the USB cable 3, and block S15 is implemented. If the mobile device 4 is set as the master device, neither the discharge circuit 15 nor the charge circuit 16 connects to the switch circuit 14, and the procedure ends.

In block S15, the determination module 103 determines whether the voltage of the battery 12 reaches the cutoff voltage. If the voltage of the battery 12 reaches the cutoff voltage, the control module 104 sets the voltage of the second input terminal of the XOR chip 151 as a low level. The switch circuit 14 disconnects to the discharge circuit 15, the discharge circuit 15 stops discharging the battery 12 and the procedure ends.

In block S16, the determination module 103 determines whether the mobile phone 1 is suitable to be the slave device according to the voltage of the battery 12. In the embodiment, the mobile phone 1 is suitable to be the slave device if the voltage of the battery 12 is less than the maximum charge voltage and no less than the cutoff voltage. If the mobile phone 1 is suitable to be the slave device, block S17 is implemented. If the mobile phone 1 is not suitable to be the slave device, the procedure ends.

In block S17, the control module 104 sets the voltage of the second input terminal of the XOR chip 151, the input terminal of the switch chip 152, and the second control pin of the USB interface 2 as low level. The switch circuit 14 connects to the charge circuit 16 if the mobile device 4 is set as the master device. The charge circuit 16 controls the battery 12 to be charged using the mobile device 4 via the USB cable 3, and block S18 is implemented. If the mobile device 4 is also set as the slave device, neither the discharge circuit 15 nor the charge circuit 16 connects to the switch circuit 14, and the procedure ends.

In block S18, the determination module 103 determines whether the voltage of the battery 12 reaches the maximum charge voltage. If the voltage of the battery 12 reaches the maximum charge voltage, the control module 104 sets the voltage of the second input terminal of the XOR chip 151 as a high level. The switch circuit 14 disconnects to the charge circuit 16, the charge circuit 16 stops charging the battery 12, and the procedure ends.

All of the processes described above may be embodied in, and fully automated via, functional code modules executed by one or more general purpose processors of the computing devices. The code modules may be stored in any type of non-transitory computer-readable medium or other storage device. Some or all of the methods may alternatively be embodied in specialized hardware. Depending on the embodiment, the non-transitory computer-readable medium may be a hard disk drive, a compact disc, a digital video disc, a tape drive or other suitable storage medium.

Although certain embodiments of the present disclosure have been specifically described, the present disclosure is not to be construed as being limited thereto. Various changes or modifications may be made to the present disclosure without departing from the scope and spirit of the present disclosure.

What is claimed is:

1. A mobile phone, comprising:
   a universal serial bus (USB) interface;
   a discharge circuit and a charge circuit;
   a switch circuit comprising a switch chip and an exclusive-OR (XOR) chip, wherein the switch chip switches a channel to connect to the discharge circuit when the voltage of an input terminal of the switch chip is at a high level, and switches the channel to connect to the charge circuit when the voltage of an input terminal of the switch chip is at a low level;
   a storage system and at least one processor; and
   one or more programs stored in the storage system and executed by the at least one processor, the one or more programs comprising:

a detection module that detects whether a mobile device is connected to the USB interface using a USB cable;

an acquisition module that acquires a selection of the mobile phone as a master device or a slave device;

a control module that sets voltages of an input terminal of the XOR chip, input terminal of the switch chip, and a control pin of the USB interface as the high level when the mobile phone is set as the master device, and charges the mobile device by discharging a battery of the mobile phone to the mobile device using the discharge circuit; or the control module sets the voltages of the input terminal of the XOR chip, the input terminal of the switch chip, and the control pin of the USB interface as the low level when the mobile phone is set as the slave device, and charges the battery of the mobile phone using the charge circuit by discharging the mobile device to the mobile phone.

2. The mobile phone of claim 1, wherein the detection module determines that the mobile device is connected to the USB interface when a connection signal is detected from the USB interface.

3. The mobile phone of claim 1, wherein the discharge circuit controls discharge of the battery of the mobile phone when the voltage of an enabling terminal and the input terminal of the switch chip are set at the high level, and the charge circuit controls charge of the battery of the mobile phone using the mobile device when the voltage of the enabling terminal and the input terminal of the switch chip are set at the low level.

4. The mobile phone of claim 1, wherein the acquisition module acquires the voltage of the battery detected from a voltage detection circuit of the mobile phone, and displays the voltage of the battery on a display screen of the mobile phone.

5. The mobile phone of claim 4, further comprising a determination module that determines whether the mobile phone is suitable to be the master device or the slave device according to the voltage of the battery.

6. The mobile phone of claim 5, wherein the determination module determines that the mobile phone is suitable to be the master device when the voltage of the mobile phone is more than a cutoff voltage and no more than a maximum charge voltage, and determines that the mobile phone is suitable to be the slave device when the voltage of the mobile phone is less than the maximum charge voltage and no less than the cutoff voltage.

7. The mobile phone of claim 5, wherein the determination module determines whether the voltage of the battery reaches the cutoff voltage when the battery is being discharged, and the control module sets the voltage of the input terminal of the XOR chip as the low level when the voltage of the battery reaches the cutoff voltage.

8. The mobile phone of claim 5, wherein the determination module further determines whether the voltage of the battery reaches the maximum charge voltage when the battery is being charged using the mobile device, and the control module sets the voltage of the input terminal of the XOR chip as the high level when the voltage of the battery reaches the maximum charge voltage.

9. A method for transferring battery power of a mobile phone, the mobile phone comprising a discharge circuit, a charge circuit, a switch circuit and a universal serial bus (USB) interface, the switch circuit comprising a switch chip and an exclusive-OR (XOR) chip, the switch chip switching a channel to connect to the discharge circuit when the voltage of an input terminal of the switch chip is at a high level, and switching the channel to connect to the charge circuit when the voltage of an input terminal of the switch chip is at a low level, the method comprising:

(a) detecting whether a mobile device is connected to the USB interface using a USB cable;

(b) acquiring a selection of the mobile phone as a master device or a slave device;

(c) setting voltages of an input terminal of the XOR chip, an input terminal of the switch chip, and a control pin of the USB interface as high level when the mobile phone is set as the master device, and charging the mobile device by discharging a battery of the mobile phone to the mobile device using the discharge circuit; or (d) setting the voltages of the input terminal of the XOR chip, the input terminal of the switch chip, and the control pin of the USB interface as low level when the mobile phone is set as the slave device, and charging the battery of the mobile phone using the charge circuit by discharging the mobile device to the mobile phone.

10. The method of claim 9, wherein the step (a) further comprises:

determining that the mobile device is connected to the USB interface when a connection signal is detected from the USB interface.

11. The method of claim 9, wherein the step (b) further comprises:

acquiring voltage of the battery detected from a voltage detection circuit of the mobile phone, and displaying the voltage of the battery on a display screen of the mobile phone.

12. The method of claim 11, further comprising:

determining whether the mobile phone is suitable to be the master device or the slave device according to the voltage of the battery;

determining that the mobile phone is suitable to be the master device when the voltage of the mobile phone is more than a cutoff voltage and no more than a maximum charge voltage; and determining that the mobile phone is suitable to be the slave device when the voltage of the mobile phone is less than the maximum charge voltage and no less than the cutoff voltage.

13. The method of claim 12, further comprising:

determining whether the voltage of the battery reaches the cutoff voltage when the battery is being discharged; and setting the voltage of the input terminal of the XOR chip as the low level when the voltage of the battery reaches the cutoff voltage.

14. The method of claim 12, further comprising:

determining whether the voltage of the battery reaches the maximum charge voltage when the battery is being charged using the mobile device; and setting the voltage of the input terminal of the XOR chip as the high level when the voltage of the battery reaches the maximum charge voltage.

15. A non-transitory storage medium storing a set of instructions, the set of instructions capable of being executed by at least one processor of a mobile phone, cause the at least one processor to execute a method for transferring battery power of the mobile phone, the mobile phone comprising a discharge circuit, a charge circuit, a switch circuit and a universal serial bus (USB) interface, the switch circuit comprising a switch chip and an exclusive-OR (XOR) chip, the switch chip switching a channel to connect to the discharge circuit when the voltage of an input terminal of the switch chip is at a high level, and switching the channel to connect to the charge circuit when the voltage of an input terminal of the switch chip is at a low level, the method comprising:
- (a) detecting whether a mobile device is connected to the USB interface using a USB cable;
- (b) acquiring a selection of the mobile phone as a master device or a slave device;
- (c) setting voltages of an input terminal of the XOR chip, an input terminal of the switch chip, and a control pin of the USB interface as high level when the mobile phone is set as the master device, and charging the mobile device by discharging a battery of the mobile phone to the mobile device using the discharge circuit; or
- (d) setting the voltages of the input terminal of the XOR chip, the input terminal of the switch chip, and the control pin of the USB interface as low level when the mobile phone is set as the slave device, and charging the battery of the mobile phone using the charge circuit by discharging the mobile device to the mobile phone.

16. The storage medium of claim 15, wherein the step (a) further comprises:
   determining that the mobile device is connected to the USB interface when a connection signal is detected from the USB interface.

17. The storage medium of claim 15, wherein the step (b) further comprises:
   acquiring detected voltage of the battery from a voltage detection circuit of the mobile phone, and displaying the voltage of the battery on a display screen of the mobile phone.

18. The storage medium of claim 17, further comprising:
   determining whether the mobile phone is suitable to be the master device or the slave device according to the voltage of the battery;
   determining that the mobile phone is suitable to be the master when the voltage of the mobile phone is more than a cutoff voltage and no more than a maximum charge voltage; and
   determining that the mobile phone is suitable to be the slave when the voltage of the mobile phone is less than the maximum charge voltage and no less than the cutoff voltage.

19. The storage medium of claim 18, further comprising:
   determining whether the voltage of the battery reaches the cutoff voltage when the battery is being discharged; and
   setting the voltage of the input terminal of the XOR chip as the low level when the voltage of the battery reaches the cutoff voltage.

20. The storage medium of claim 18, further comprising:
   determining whether the voltage of the battery reaches the maximum charge voltage when the battery is being charged using the mobile device; and
   setting the voltage of the input terminal of the XOR chip as the high level when the voltage of the battery reaches the maximum charge voltage.

* * * * *